UNITED STATES PATENT OFFICE.

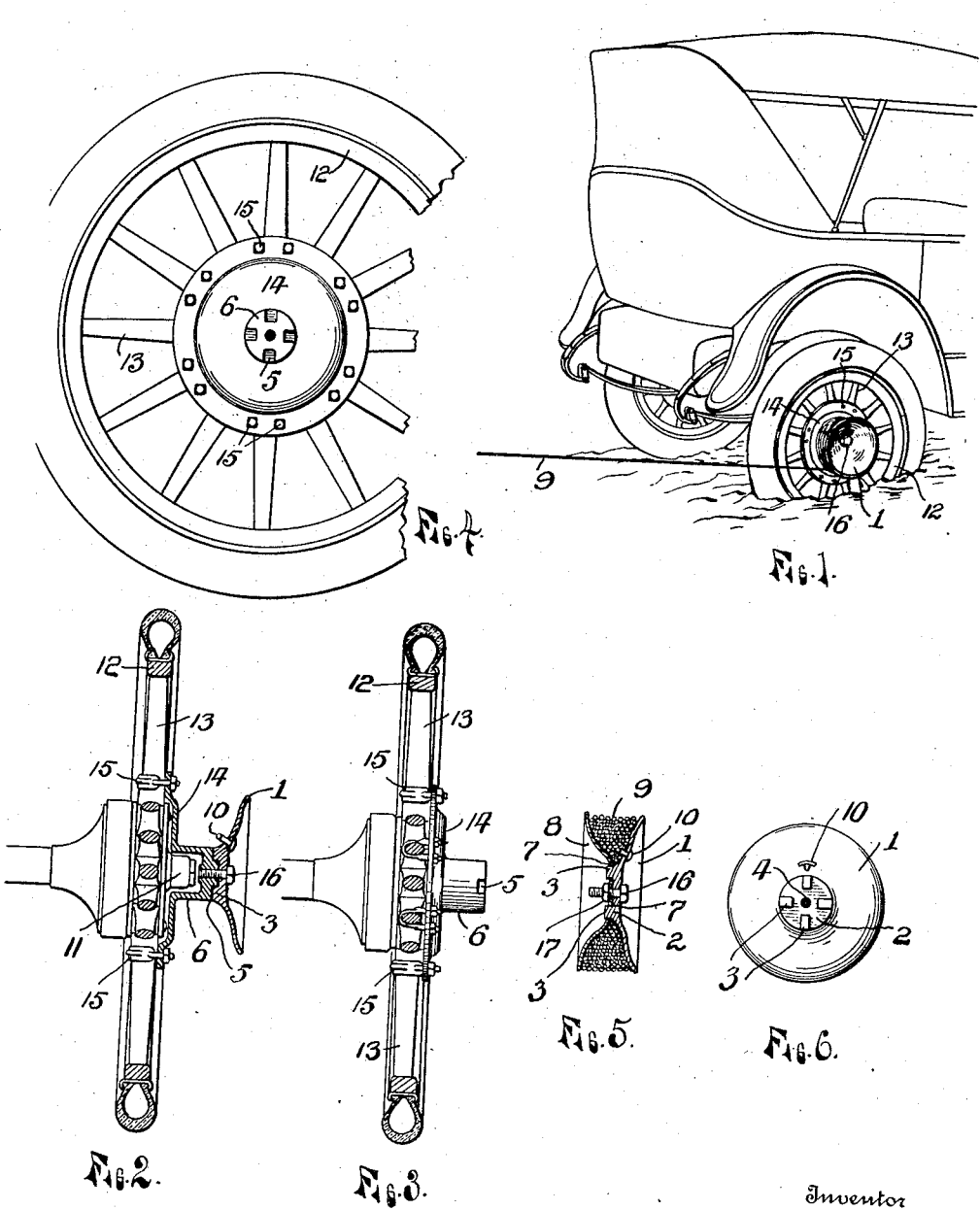

ONESIME ROUSSEAU, OF DETROIT, MICHIGAN.

ATTACHMENT FOR WHEELS OF MOTOR-VEHICLES.

1,289,005.          Specification of Letters Patent.      Patented Dec. 24, 1918.

Application filed August 15, 1918. Serial No. 249,973.

*To all whom it may concern:*

Be it known that I, ONESIME ROUSSEAU, a citizen of the United States of America, residing at Detroit, in the county of Wayne and State of Michigan, have invented certain new and useful Improvements in Attachments for Wheels of Motor-Vehicles, of which the following is a specification, reference being had therein to the accompanying drawings.

My invention aims to provide an attachment for automobile wheels, by which the wheels of an automobile or self-propelled vehicle may be extricated from ruts, holes, and such difficult places where the power of the vehicle is not sufficient, or road conditions so bad that the vehicle cannot extricate itself.

The attachment is in the form of a cable spool that may be easily and quickly attached to one of the rear drive wheels of an automobile and with the cable of the spool attached to a tree, post or other stationary body, the power of the automobile may be employed to wind the cable on the spool and thus pull the automobile out of a difficult position. The cable spool includes an auxiliary hub that may be permanently attached to the spokes of a wheel over the ordinary hub, particularly when touring or making a trip on an unknown road. The cable spool *per se*, can be readily carried as an automobile accessory and its attachment to the auxiliary hub may be quickly accomplished in a manner that will include any slippage of the spool or accidental displacement when power is applied to the same.

My invention will be hereinafter specifically described and then claimed, and reference will now be had to the drawings, wherein—

Figure 1 is a perspective view of the rear portion of an automobile, showing one of the wheels thereof provided with the attachment;

Fig. 2 is a vertical cross sectional view of an automobile wheel provided with the attachment;

Fig. 3 is a similar view showing the auxiliary hub devoid of the cable spool;

Fig. 4 is a side elevation of the same;

Fig. 5 is a longitudinal sectional view of the cable spool, as ordinarily carried, and Fig. 6 is a side elevation of one of the members of the spool.

The spool comprises an outer disk shaped or dished member 1. The member 1 has a central hub portion 2 provided with a plurality of radially disposed teeth 3 and a central opening 4, said teeth being disposed on the inner face of the hub portion 2 so as to either enter notches 5 of an auxiliary hub 6 or opening 7 of a detachable inner spool member 8, which is also dished similar to the outer member 1, so as to coöperate therewith in providing an annular groove adapted for holding a cable, chain or flexible member 9, wound on the spool with the inner convolution thereof connected to the outer spool member 1, as at 10. The outer spool member may have a pin or hook shaped member over which the inner end of the cable may be looped or otherwise attached.

The auxiliary hub 6 is adapted to inclose the ordinary hub 11 of a wheel 12 having spokes 13, said auxiliary hub having a peripheral flange 14 connected to the spokes 13 by a plurality of clips or U-bolts 15, thus holding the auxiliary hub for rotative continuity with the wheel 12 when movement is imparted thereto by the power plant of the automobile.

The central opening 4 of the outer member 1 accommodates a screw bolt 16 and this screw bolt, in conjunction with a nut 17 is adapted to retain the inner spool member 8 in engagement with the outer spool member 1, as shown in Fig. 5, thus permitting of the spool being readily handled as a unitary structure and carried about the automobile for emergency purposes. By removing the nut 17 the screw bolt 16 can be tapped or screwed into the outer end of the auxiliary hub 6, as shown in Fig. 2, thus allowing the outer spool member 1 to coöperate with the auxiliary hub 6 in providing a spool or annular cable way on which the cable 9 may be wound. In some instances, after the nut 17 is removed, the inner spool member 8 may be left in engagement with the outer spool member 1, since the teeth 3 project sufficiently through the inner spool member 8 to engage in the notches 5 of the auxiliary hub. This may be desirable when it is only necessary to use a short length of the cable for the purposes for which it is intended.

In the actual practice of my invention, the inner spool member 8 will be removed and the free end of the cable 9 carried to and attached to a stationary support. The outer spool member 1 will then be attached to the auxiliary hub and on placing the automobile in operation, the cable 9 will be wound upon the spool to pull the automobile rearwardly and thus remove its impeded wheel or wheels to solid ground where progress may be made. On city streets or good roads where no trouble may be experienced, the auxiliary hub 6 may be removed and it is only for emergency purposes that the detachable spools are carried as an accessory.

One embodiment of my invention has been illustrated, but it is to be understood that the structural elements are susceptible to such variations and modifications as fall within the scope of the appended claims.

What I claim is:—

1. The combination with an automobile wheel, of an auxiliary hub attached thereto, an outer spool member adapted to be attached to said auxiliary hub to coöperate therewith in providing a spool, a cable attached to said outer spool member, and a detachable inner spool member adapted to be held in engagement with said outer spool member to coöperate therewith in maintaining said cable wound on said spool when not in use.

2. A wheel extricating device comprising a hub adapted for attachment to a wheel to be rotated thereby, an outer spool member adapted to be attached to said hub, a cable attached to said outer spool member, and adapted to be wound between said hub and said outer spool member, and means adapted to be attached to said outer spool member to coöperate therewith in maintaining a wound cable in engagement with said outer spool member when detached from said hub.

In testimony whereof I affix my signature in the presence of two witnesses.

ONESIME ROUSSEAU.

Witnesses:
ANNA M. DORR,
CHAS. W. STAUFFIGER.

Copies of this patent may be obtained for five cents each, by addressing the "Commissioner of Patents, Washington, D. C."